March 16, 1965  C. E. MAYO  3,173,564
COMPARTMENT TRUCK
Filed Jan. 7, 1963  4 Sheets-Sheet 1
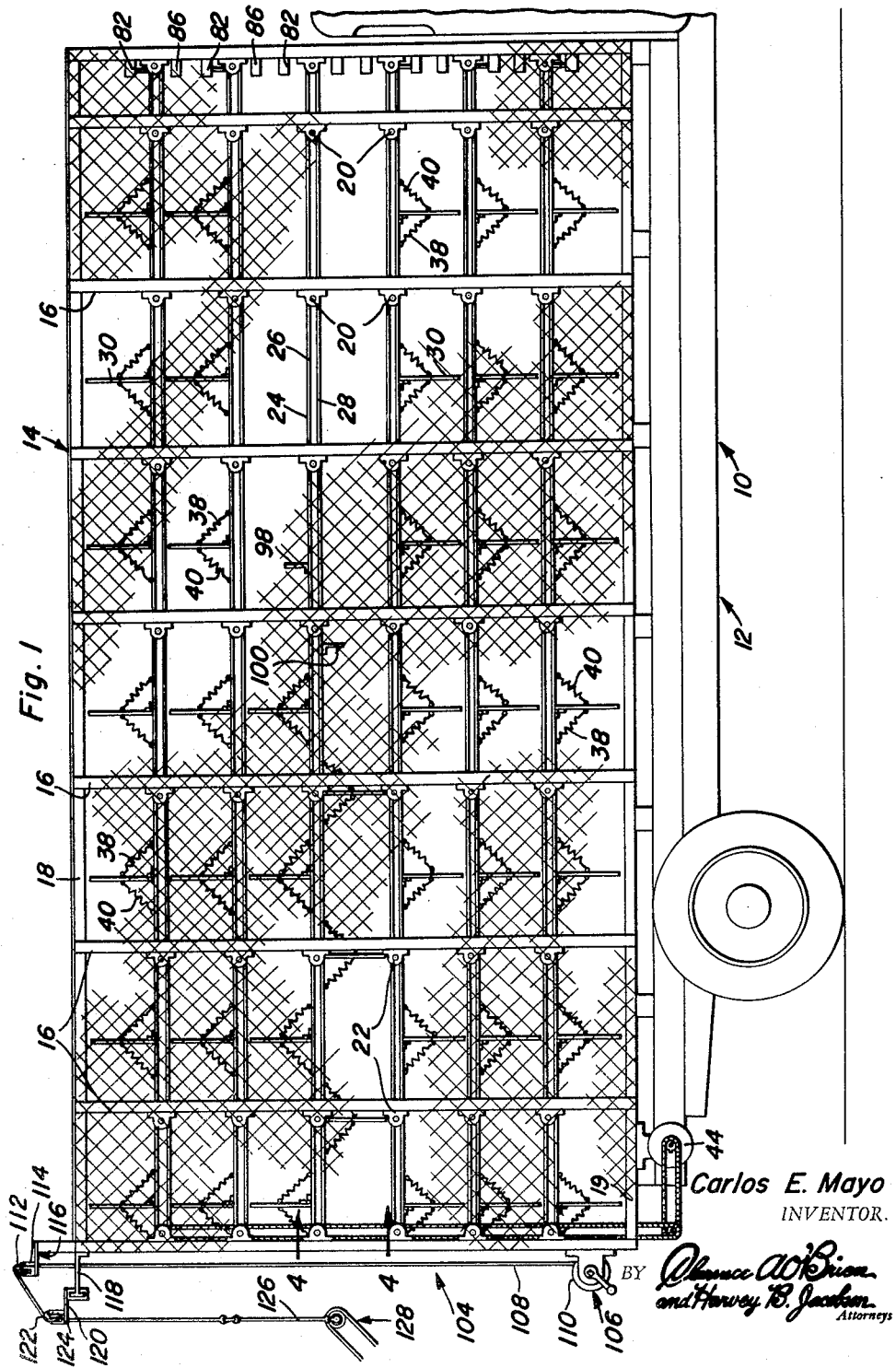
Carlos E. Mayo
INVENTOR.

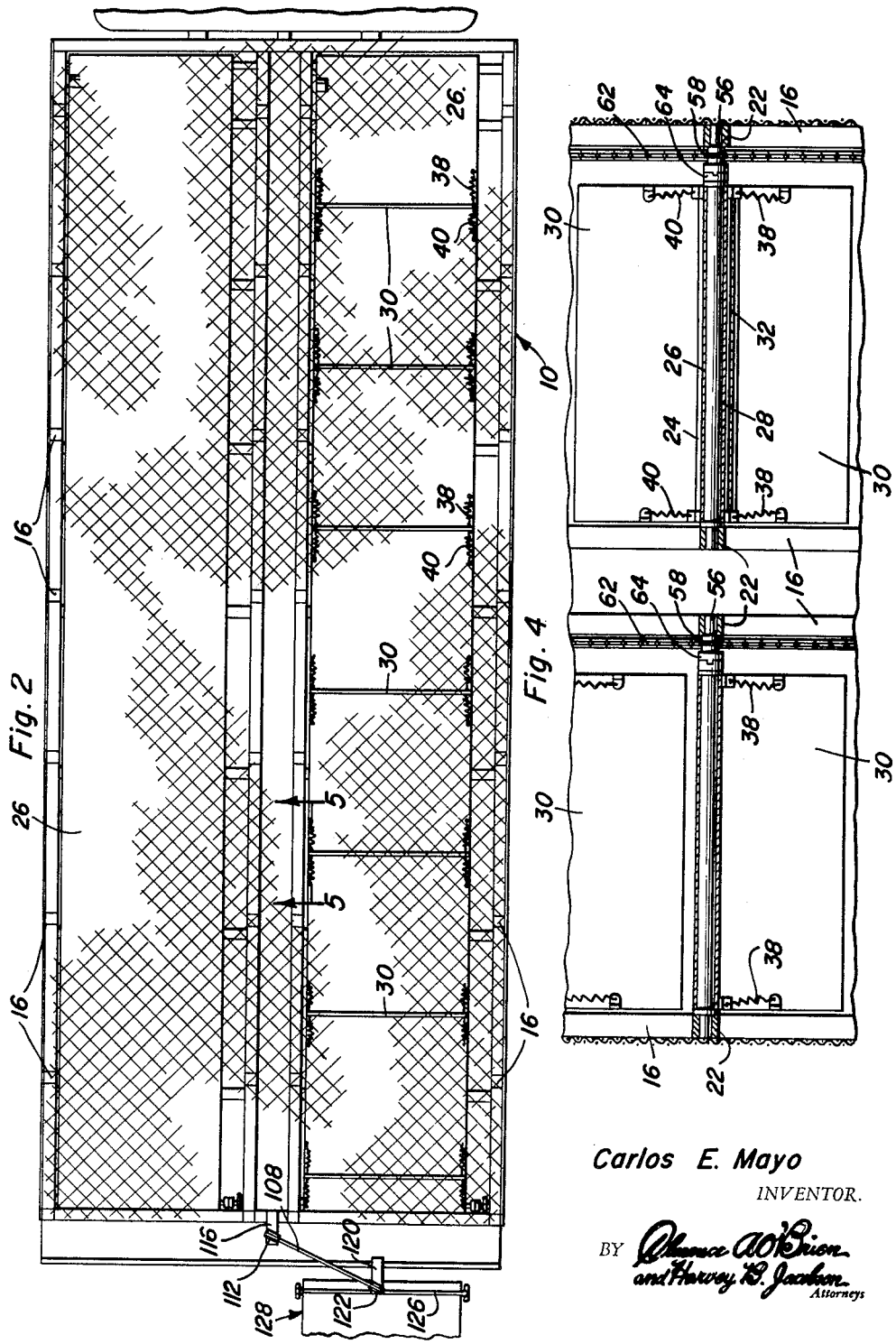

March 16, 1965    C. E. MAYO    3,173,564
COMPARTMENT TRUCK
Filed Jan. 7, 1963    4 Sheets-Sheet 3
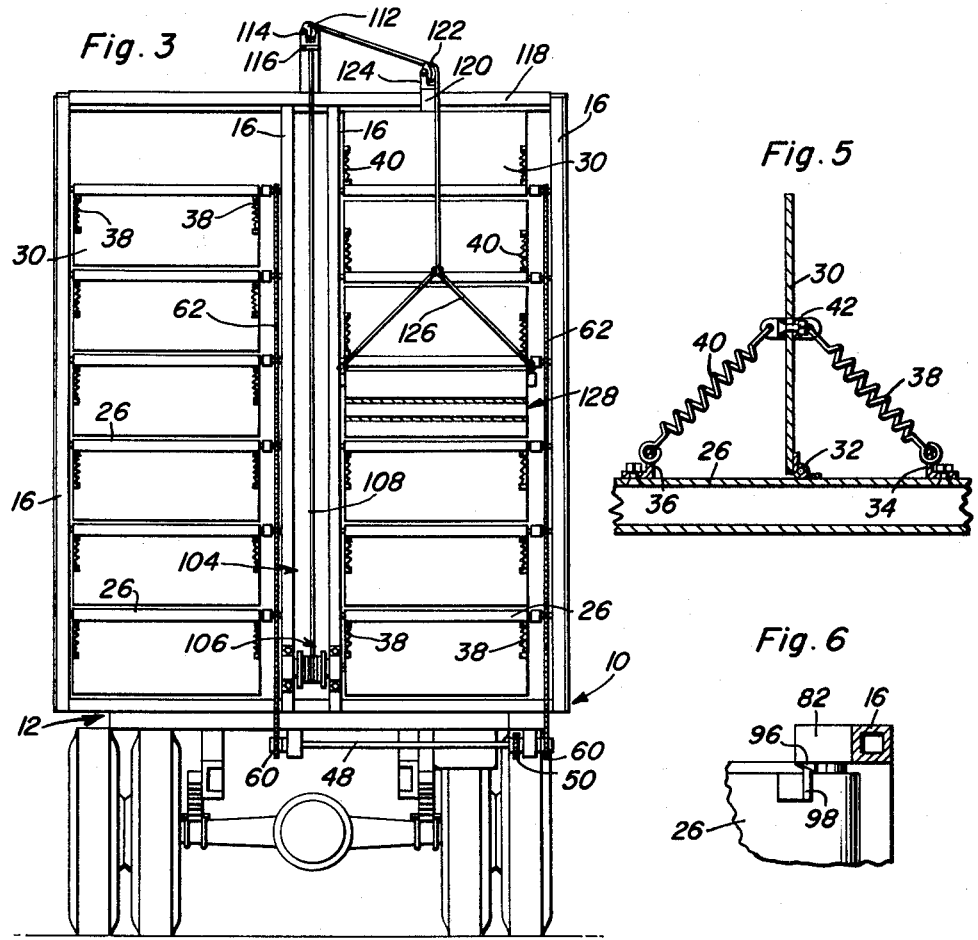
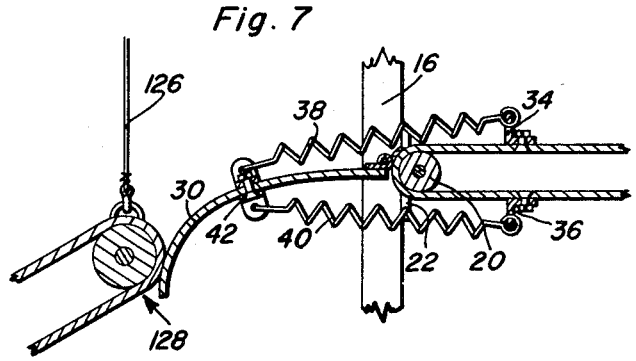
Carlos E. Mayo
INVENTOR.

March 16, 1965
C. E. MAYO
3,173,564
COMPARTMENT TRUCK
Filed Jan. 7, 1963
4 Sheets-Sheet 4
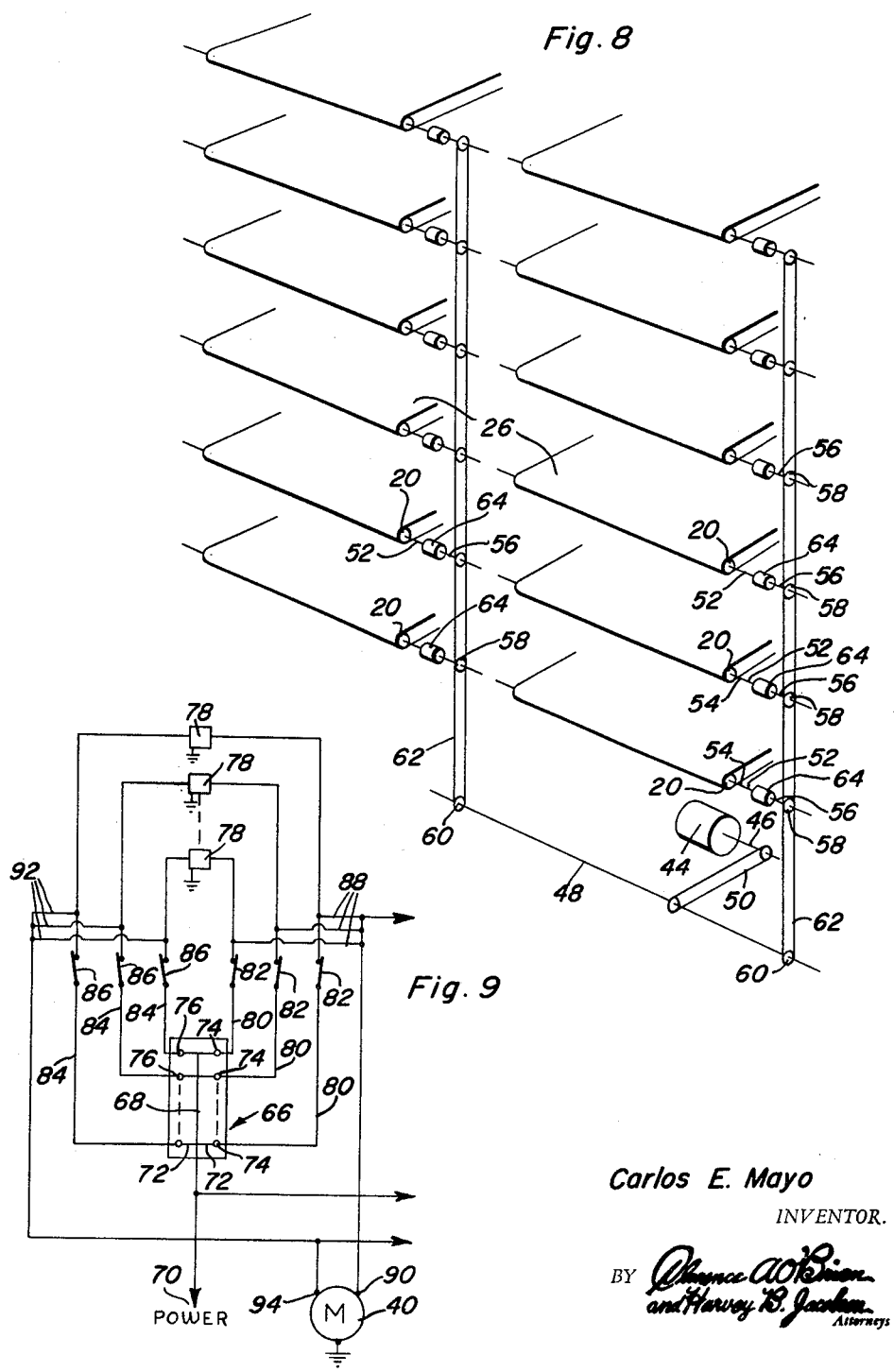
Carlos E. Mayo
INVENTOR.
BY *Clarence A. O'Brien*
and *Harvey B. Jackson*
Attorneys

United States Patent Office 3,173,564
Patented Mar. 16, 1965

3,173,564
COMPARTMENT TRUCK
Carlos E. Mayo, Rte. 5, P.O. Box 365, Springdale, Ark.
Filed Jan. 7, 1963, Ser. No. 249,770
7 Claims. (Cl. 214—522)

This invention relates to a novel and useful truck construction and more specifically to a truck which is constructed in a manner enabling a plurality of chickens or the like to be loaded on, stored in during transit and unloaded from the truck with a minimum amount of effort and time being expended.

Although the vehicle constructed in accordance with the present invention is illustrated and described herein as comprising a wheeled truck, it is to be noted that the poultry loading, storing and unloading apparatuses of the instant invention may be readily incorporated into the construction of other types of vehicles.

At the present time when it is desired to ship poultry from one location to another, the poultry is caught in the poultry house and placed into poultry crates with chickens or the like being placed in each crate or coop. During the process of chasing and catching the chickens, certain of the chickens will become bruised and their value will be reduced. Any time a chicken or the like is handled manually, the chicken is bruised to some extent. In addition, after chickens have been loaded into coops by conventional methods, the coops are then loaded on a suitable vehicle such as a truck for shipment to their destination. In addition to being bruised while being chased and caught for placement in the chicken coops, as the coops are loaded onto the truck additional ones of the chickens are bruised.

In addition to the conventional method of shipping chickens in individual coops resulting in certain ones of the chickens being bruised and thus reduced in value, the hand loading of the individual chicken coops and the handling of the loaded coops both in loading and unloading the vehicle by which the chickens are to be transported requires many man hours of work. Therefore, it may be seen that the chicken farmer's profit is substantially reduced in just getting his chickens to market.

It is therefore the main object of this invention to provide a novel apparatus and method for loading, transporting and unloading chickens and the like that will enable the chickens to be loaded, transported and unloaded without being bruised and with less man hours being needed for loading and unloading the transporting vehicle.

A further object of this invention, in accordance with the immediately preceding object, is to provide a transporting vehicle with a plurality of endless conveyors each including an endless flexible member disposed in a pair of closely adjacent upper and lower generally horizontally disposed reaches and with the endless conveyors being arranged in one or more sets of a plurality of vertically stacked conveyors. In this manner, the upper and lower reaches of the endless flexible members may be utilized to define the flooring and top wall of the plurality of vertically stacked storage reaches for receiving numerous chickens.

Another object of this invention, in accordance with the preceding object, is to provide each of the endless flexible members with a plurality of transversely extending partition walls that are spaced longitudinally therealong throughout the length of one of the reaches defined thereby and with the partition walls projecting outwardly from the outer surfaces of the corresponding endless flexible member defining item receiving compartments between adjacent ones of the partition walls. In this manner, as the endless flexible members of the conveyors are moved through their paths of movement successive ones of the item receiving compartments defined by adjacent ones of the partition walls will be moved into registry with one end of the corresponding endless conveyor and as each partition wall moves from one reach of the corresponding endless flexible member to the other reach thereof, the adjacent end of the corresponding compartment will be opened. In this manner, the compartments defined by the endless flexible members may be successively opened at one end of the corresponding endless conveyor for receiving or discharging a plurality of chickens or the like.

Another object of this invention, in accordance with the immediately preceding object, is to provide the transporting vehicle with means adapted to support one end of a loading conveyor in alignment with selected ones of the ends of the endless conveyors.

Still another object of this invention is to provide motor means and drive means for selectively drivingly connecting the motor means with the endless conveyors.

Yet another object of this invention is to provide a motor means which is reversible whereby the endless conveyors may be reversed in direction of movement.

A final object of this invention to be specifically enumerated herein is to provide a transportation vehicle constructed in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary side elevational view of the truck of the instant invention shown with a loading conveyor positioned to receive chickens being unloaded from one of the reach of storage compartments defined by the instant invention;

FIGURE 2 is a fragmentary top plan view of the embodiment illustrated in FIGURE 1;

FIGURE 3 is a rear elevational view of the embodiment illustrated in FIGURES 1 and 2;

FIGURE 4 is an enlarged fragmentary vertical transverse sectional view taken substantially on the plane indicated by the section line 4—4 of FIGURE 1;

FIGURE 5 is an enlarged longitudinal vertical sectional view taken substantially upon the plane indicated by the section line 5—5 of FIGURE 2;

FIGURE 6 is a fragmentary horizontal sectional view showing the manner in which each of the endless flexible members of the conveyors of the truck is provided with means for limiting movement of the endless flexible member in one direction;

FIGURE 7 is a fragmentary longitudinal vertical sectional view showing the manner in which the flexible partition walls of the endless flexible members may be utilized to bridge the gap between the loading conveyor and the storage conveyor of the truck with which the loading conveyor is registered;

FIGURE 8 is a perspective diagrammatic view showing the manner in which the motor means is operatively connected to the endless conveyors; and FIGURE 9 is a fragmentary diagrammatical view of the wiring circuit for a portion of the invention.

Referring now more specifically to the drawings the numeral 10 generally designates a truck which includes a main frame generally referred to by the reference numeral 12. The truck 10 may be conventional in design and has a supporting frame generally referred to by the reference numeral 14 secured thereto. The supporting frame 14 includes a plurality of interconnected vertical members 16 and horizontal members 18 and 19 which are disposed in vertical planes extending longitudinally of the truck 12. The horizontal members 18 and 19 interconnect the upper and lower ends of the vertical members 16 and adjacent ones of transversely spaced pairs of vertical members 16 are interconnected by means of a plurality of rollers 20 whose opposite ends are rotatably supported by means of journal blocks 22 secured to the vertical members 16 at points spaced longitudinally therealong.

From FIGURE 1 of the drawings it may be seen that the rollers 20 are disposed in vertically stacked reaches of a plurality of rollers and that each reach of rollers 20 provides a support for the upper reach 24 of an endless flexible member 26 which defines a conveyor also including a lower reach 28.

Each of the endless flexible members 26 has a plurality of partition walls 30 spaced longitudinally therealong and projecting outwardly from its outer surfaces. Each of the partition walls 30 is pivotally secured at its inner end by means of the hinge assembly 32 to the corresponding conveyor or endless flexible member 26. In addition, a pair of anchors 34 and 36 are secured to each flexible member 26 for each of the partition walls 30 thereof and are utilized to anchor one pair of ends of a pair of expansion springs 38 and 40, respectively, to the endless flexible member 26. The other pair of ends of the expansion springs 38 and 40 are secured to the corresponding partition wall 30 by means of a clamp assembly 42. Each of the clamp assemblies 42 is spaced outwardly from the inner edge portion of the corresponding partition wall 30.

With attention now directed to FIGURES 2 and 3 of the drawing it will be noted that the truck 10 includes a pair of sets of vertically stacked conveyors 26 and that the sets of conveyors are disposed in side-by-side generally parallel relation.

With attention now directed to FIGURE 8 of the drawings it may be seen that an electric motor 44 is supported from the truck 10 and includes an output shaft 46 which is drivingly connected to a lay shaft 48 by means of an endless flexible member 50.

Each of the rollers 20 is provided with a stub shaft portion 52 which includes a first section 54 that is fixed relative to the roller 20 and a second section 56 which has a gear wheel or sprocket wheel 58 mounted thereon for rotation therewith. The opposite ends of the lay shaft 48 have sprocket wheels 60 mounted thereon and each sprocket wheel 60 is drivingly connected to the corresponding sprocket wheel 58 by means of an endless flexible member 62.

The first and second sections 54 and 56 of each stub shaft 52 may be selectively drivingly connected together by means of a solenoid operated clutch 64 in order that a selected one of the rollers 20 may be drivingly connected to the motor 44 independently of the other rollers 20.

From FIGURE 9 of the drawings it may be seen that a remote control panel assembly generally referred to by the reference numeral 66 is provided and that the assembly 66 includes a centrally disposed conductor 68 which extends to the power source 70. A plurality of branch conductors 72 electrically connect the main conductor 68 with a plurality of pushbutton switches 74 and 76 for operating the solenoid actuated clutches 78 and the motor 44 in the desired direction. A plurality of conductors 80 have limit switches 82 serially connected therein and electrically connect the pushbutton switches 74 with the solenoid 78 and a plurality of conductors 84 having limit switches 86 serially connected therein electrically connect the pushbutton 76 with the solenoid 78 of the solenoid actuated clutches 64.

Still further, a plurality of branch conductors 88 electrically connect the conductors 80 with the terminal 90 of the electric motor 40 and a plurality of branch conductors 92 electrically connect the conductors 84 with the terminal 94 of the electric motor 40. It is to be noted that completion of a circuit between the power source 70 and the terminal 90 will effect rotation of the electric motor 40 in one direction while completion of the circuit between the power source 70 and the terminal 94 will effect rotation of the electric motor 40 in the opposite direction.

With attention now directed to FIGURE 6 of the drawings it may be seen that each of the limit switches 82 includes a movable actuator 96 and it is to be noted that when the abutment 98 carried by the corresponding endless flexible member 26 engages the actuator 96 the limit switch 82 will be opened thereby opening the circuit between the power source 70 and the electric motor 40 by way of the terminal 90.

From FIGURE 1 of the drawings it may be seen that the limit switches 82 and 86 are substantially identical and that each of the endless flexible members 26 includes an abutment 100 which is engageable with the corresponding one of the limit switches 86. Accordingly, the abutments 98 and 100 are utilized to terminate movement of each of the endless flexible members 26 in opposite directions.

A loading conveyor support assembly generally referred to by the reference numeral 104 is provided and includes a winch assembly generally referred to by the reference numeral 106 having one end of a flexible pull member 108 wound about the drum 110 thereof. The winch assembly 106 is secured to the rear of the truck 10 in any convenient manner and the free end of the flexible pull member 108 passes upwardly and over a pulley 112 which is rotatably supported by means of a bifurcated mount 114 on top of the truck. The bifurcated mount 114 is pivotally secured to the brace 116 for movement about an upstanding axis disposed normal to the axis of rotation of the pulley 112. In addition, an elongated transversley extending guide flange 118 projects rearwardly from the upper end of the truck 12 and a support arm 120 is slidably engaged with the support flange 118 for movement transversely of the truck 10. The free end of the support arm 120 has a pulley 122 rotatably mounted thereon by means of a bifurcated mount 124 which is pivotally supported from the support arm 120 for rotation about an upstanding axis disposed normal to the axis of rotation of the pulley 122. The free end of the pull member 108 passes over the pulleys 112 and 122 and then down to and is secured to an inverted V-shaped bridle 126 which supports the free end of a loading conveyor generally referred to by the reference numeral 128.

With attention now directed to FIGURE 7 of the drawings it may be seen that each of the partition walls 30 is constructed of flexible but semi-rigid material and that the free end edge portion of each partition wall 30 may bend so as to provide clearance for each partition wall 30 between the corresponding flexible member 26 and the discharge end of the loading conveyor 128.

The remote control panel assembly 66 may be of a portable type and have the pushbuttons 74 and 78 thereof electrically connected to the solenoids 78, the limit switches 82 and 86 and the motor 40 by means of extension cords comprising the conductors 80, 84, 88 and 92. It is to be noted that the control assembly illustrated in FIGURE 9 of the drawing comprises only one-half of the control assembly which will be needed to operate both sets of vertically stacked conveyors.

In operation, and with attention now directed to FIGURE 1 of the drawings, it will be observed that the upper reaches 24 comprise the flooring members for the storage reaches defined by the conveyor 26. When it is desired to load the truck, assuming that all of the conveyors are positioned as are the three lower conveyors illustrated in FIGURE 1 of the drawings, the loading conveyor 128 is first aligned with the upper conveyor 26. The upper conveyor is actuated for a short period of time until the first partition wall from the right is positioned a slight distance forwardly of the discharge end of the loading conveyor 128 with the second partition wall 30 from the right as viewed in FIGURE 1 being positioned as illustrated in FIGURE 7. Then, the first compartment defined between the first and second partition walls 30 is filled with chickens being discharged from the loading conveyor 128. As the first compartment is filled, the upper conveyor 26 is again actuated to move the first and second partition walls 30 forwardly of the truck 10 until the third partition wall is positioned as viewed in FIGURE 7 of the drawings. The above process is repeated until the compartments of each conveyor are formed with the desired number of chickens and then the other conveyors may also be similarly loaded working from the top of the truck down to the lowermost conveyor. Then, when it is desired to unload the truck 10, the above process is reversed and the lowermost conveyors 26 are first emptied. The limit switches 82 and 86 will limit movement of the conveyors 26 to the full and emptied positions respectively as illustrated by the upper and lowermost conveyors 26 in FIGURE 1 of the drawings. It may, of course, be noted that the bridle 126 is suspended in a manner whereby the loading conveyor 128 may be properly vertically adjusted in alignment with one of the conveyors 26 of one set of conveyors and thereafter be moved laterally of the truck 10 into alignment with the corresponding conveyor of the adjacent set of conveyors without actuating the winch assembly 106. After the conveyors 26 at each level have been either filled or emptied, the winch assembly 126 may then be utilized to vertically adjust the outlet end of the loading conveyor 128 as desired.

The foregoing is considered as illustrative only of the principles of the invention. Further, since numerous modifications and changes will readily occur to those skilled in the art, it is not desired to limit the invention to the exact construction and operation shown and descirbed, and accordingly all suitable modifications and equivalents may be resorted to, falling within the scope of the invention as claimed.

What is claimed as new is as follows:

1. A vehicle having means for loading, storing and unloading a plurality of items, said means including a frame defining a set of a plurality of vertically stacked endless flexible conveyors each supported in a pair of generally horizontal closely vertically spaced reaches, the upper reach of each endless conveyor including a plurality of upstanding and upwardly projecting partition walls extending transversely thereof and secured thereto at points spaced longitudinally therealong and defining a plurality of compartments therebetween, the space between each upper reach and the lower reach of the conveyor disposed thereabove being slightly greater than the vertical extent of the partition walls carried by the corresponding upper reach, the lower reach of each conveyor being free of said partition walls, and drive means selectively drivingly connectible to each of said endless conveyors for intermittently longitudinally advancing said endless conveyors.

2. The combination of claim 1 wherein said vehicle includes means defining a plurality of sets of vertically stacked endless conveyors disposed in side-by-side parallel relation.

3. The combination of claim 2 including means supported from said frame adapted to support one end of a loading conveyor in alignment with selected upper reaches of said endless conveyors.

4. The combination of claim 3 wherein the last-mentioned means includes means adapted to selectively vertically and horizontally shift said one end of said loading conveyor.

5. The combination of claim 1 wherein said drive means is reversible.

6. The combination of claim 1 wherein said partition walls are each constructed of flexible but semi-rigid material.

7. The combination of claim 1 wherein said partition walls are each pivotally secured to the corresponding reach for rotation about an axis disposed adjacent and extending transversely of the corresponding reach, means connected between said partition walls and the adjacent portions of the corresponding endless conveyor yieldingly urging said partition walls toward a position disposed at right angles relative to the adjacent portions of the corresponding endless conveyor.

References Cited by the Examiner
UNITED STATES PATENTS

| | | | |
|---|---|---|---|
| 1,224,379 | 5/17 | Honohan | 198—170 X |
| 1,358,167 | 11/20 | Levin | 198—170 |
| 2,099,774 | 11/37 | Spencer | 119—12 |
| 2,454,101 | 11/48 | Snead | 214—83.22 |
| 2,521,727 | 9/50 | Kappen | 214—84 X |
| 2,605,912 | 8/52 | Small et al. | 214—84 X |
| 3,090,515 | 5/63 | Crowther | 214—83.26 X |

HUGO O. SCHULZ, *Primary Examiner.*

GERALD M. FORLENZA, *Examiner.*